United States Patent
Pan et al.

(10) Patent No.: US 10,620,334 B2
(45) Date of Patent: Apr. 14, 2020

(54) MODIFYING MAGNETIC TILT ANGLE USING A MAGNETICALLY ANISOTROPIC MATERIAL

(71) Applicant: HALLIBURTON ENERGY SERVICES, INC., Houston, TX (US)

(72) Inventors: Li Pan, Sinagpore (SG); Chao-Fu Wang, Singapore (SG); Wei Hsuan Huang, Singapore (SG); Rencheng Song, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 193 days.

(21) Appl. No.: 15/531,707

(22) PCT Filed: Dec. 31, 2014

(86) PCT No.: PCT/US2014/073024
§ 371 (c)(1),
(2) Date: May 30, 2017

(87) PCT Pub. No.: WO2016/108900
PCT Pub. Date: Jul. 7, 2016

(65) Prior Publication Data
US 2017/0322336 A1    Nov. 9, 2017

(51) Int. Cl.
*G01V 3/28* (2006.01)
*G01V 3/30* (2006.01)

(52) U.S. Cl.
CPC . *G01V 3/28* (2013.01); *G01V 3/30* (2013.01)

(58) Field of Classification Search
CPC ... G01V 3/18; G01V 3/28; G01V 3/30; G01V 3/26; G01V 11/002; H01Q 19/00; H01Q 19/06; H01Q 19/062; H01Q 19/09
USPC .......... 324/333, 338–343; 343/787, 788
See application file for complete search history.

(56) References Cited

U.S. PATENT DOCUMENTS

| | | |
|---|---|---|
| 3,961,297 A | 6/1976 | Garshelis |
| 6,933,726 B2 | 8/2005 | Chen et al. |
| 7,019,528 B2 | 3/2006 | Bittar |
| 7,057,253 B2 | 6/2006 | Braun |
| 7,128,988 B2 | 10/2006 | Lambeth |
| 7,414,391 B2 | 8/2008 | Homan et al. |
| 8,358,414 B2 | 1/2013 | Csutak |

(Continued)

FOREIGN PATENT DOCUMENTS

| | | |
|---|---|---|
| WO | 2008/008386 | 1/2008 |
| WO | 2008/076130 | 6/2008 |

(Continued)

OTHER PUBLICATIONS

AU Examination Report dated Nov. 23, 2017.
(Continued)

*Primary Examiner* — Steven L Yeninas
(74) *Attorney, Agent, or Firm* — Jason Sedano; C. Tumey Law Group PLLC

(57) ABSTRACT

Methods and tools for modifying magnetic tilt angle using a magnetically anisotropic material are disclosed. An electromagnetic logging tool includes an antenna coil oriented at a physical tilt angle relative to a longitudinal axis of the tool and a magnetically anisotropic material that modifies a magnetic tilt angle of the coil relative to the physical tilt angle a coil tilted at a physical tilt angle relative to an axis of the tool.

20 Claims, 6 Drawing Sheets

(56) References Cited

U.S. PATENT DOCUMENTS

| | | | |
|---|---|---|---|
| 8,433,518 | B2 | 4/2013 | Omeragic et al. |
| 9,865,925 | B2* | 1/2018 | Mitchell ............ H01Q 9/0407 |
| 9,865,930 | B1* | 1/2018 | Tonn ..................... H01Q 13/12 |
| 9,964,659 | B2* | 5/2018 | Fouda ..................... G01V 3/30 |
| 2002/0180654 | A1* | 12/2002 | Acher ..................... H01Q 9/04 343/767 |
| 2003/0020655 | A1* | 1/2003 | McKinzie, III ........ H01Q 1/38 343/700 MS |
| 2005/0030038 | A1* | 2/2005 | Chen ........................ G01V 3/28 324/343 |
| 2008/0258733 | A1* | 10/2008 | Bittar ..................... G01V 3/28 324/333 |
| 2010/0045285 | A1 | 2/2010 | Ohmori et al. |
| 2010/0073232 | A1* | 3/2010 | Sajuyigbe ............ H01Q 19/025 342/372 |
| 2010/0156573 | A1* | 6/2010 | Smith .................... H01P 3/081 333/239 |
| 2011/0140691 | A1 | 6/2011 | Roy |
| 2011/0140701 | A1 | 6/2011 | Legendre et al. |
| 2011/0169488 | A1 | 7/2011 | Mather |
| 2011/0175605 | A1 | 7/2011 | Kim et al. |
| 2012/0280872 | A1* | 11/2012 | Werner ............ H01Q 15/0053 343/753 |
| 2013/0285665 | A1* | 10/2013 | Wu ......................... G01V 3/28 324/339 |
| 2014/0104136 | A1* | 4/2014 | Werner .................... H01Q 9/32 343/900 |

FOREIGN PATENT DOCUMENTS

| | | |
|---|---|---|
| WO | 2011/129828 | 10/2011 |
| WO | 2013/092836 | 6/2013 |

OTHER PUBLICATIONS

PCT International Search Report and Written Opinion, dated Sep. 1, 2015, Appl No. PCT/US2014/073063, "Modifying Magnetic Tilt Angle Using a Magnetically Anisotropic Material," Filed Dec. 31, 2014, 15 pgs.

Ding, W, et al., "Characteristics of Electromagnetic Wave Propagation in Uniaxially Anisotropic Left-Handed Materials," Progress in Electromagnetics Research, PIER 70, 37-52, 2007.

Krupka, Jerzy, "Measurements of All Complex Permeability Tensor Components and the Effective Line Widths of Microwave Ferrites Using Dielectric Ring Resonators," IEEE Transactions on Microwave Theory and Techniques, vol. 39, No. 7, Jul. 1991, pp. 1148-1157.

Landau, L D. et al., "Electrodynamics of Continuous Media," Course of Theoretical Physics, 1960, vol. 8, Pergamon Press, New York, United States.

Li, Z W. et al., "Ultrabroad Bandwidth and Matching Characteristics for Spinel Ferrite Composites with Flaky Fillers," Journal of Applied Physics 108, 063927, 2010, American Institute of Physics.

Thompson, G. H B. et al., "Ferrites in Waveguides," Journal of the British Institution of Radio Engineers, Jun. 1956, p. 311-328, vol. 16, No. 6.

Tumanski, Slawomir, "Modern Magnetic Field Sensors—a Review," Przeglad Elektrotechniczny, Oct. 2013, p. 1-12, Wydawnictwo SIGMA-NOT Sp. z o.o., Warsaw Poland.

Canadian Office Action for Application No. 2,969,310 dated Mar. 15, 2018.

* cited by examiner

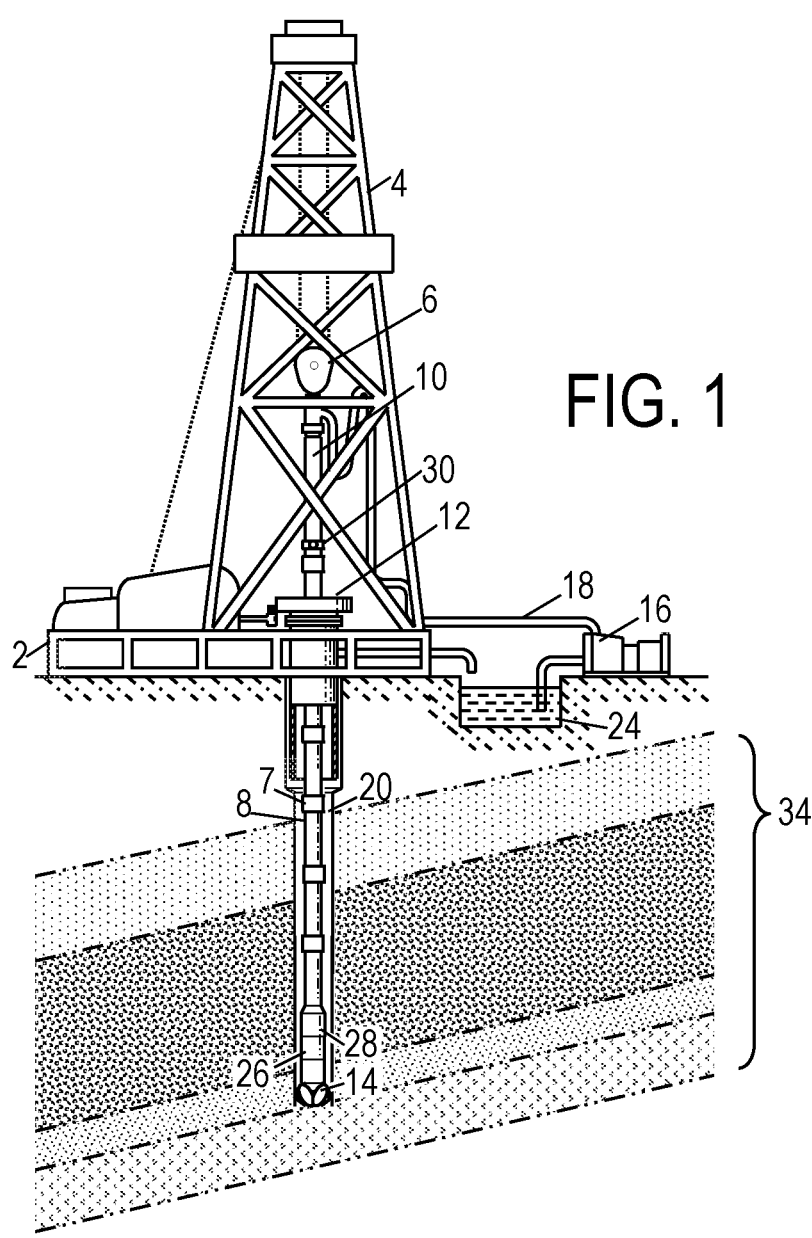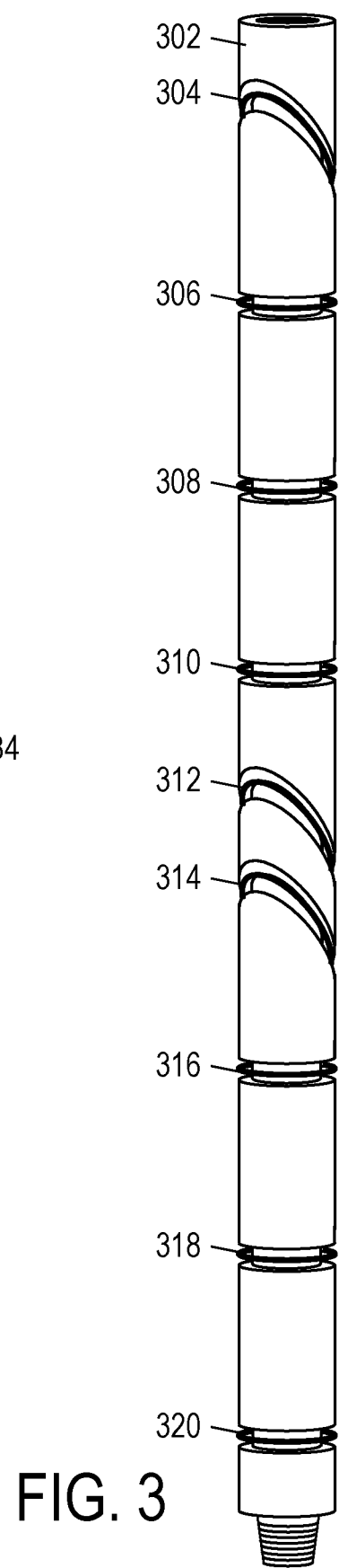

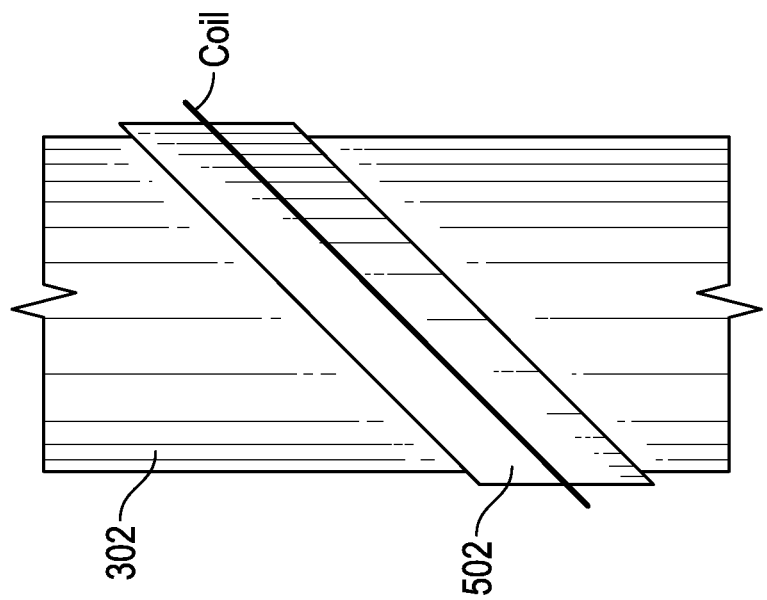
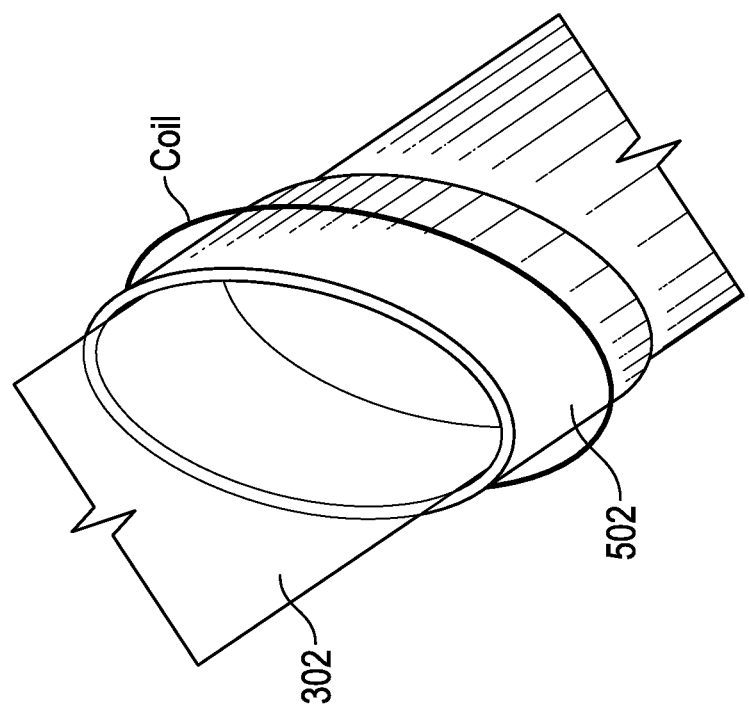
FIG. 5B

MODIFYING MAGNETIC TILT ANGLE USING A MAGNETICALLY ANISOTROPIC MATERIAL

BACKGROUND

Modern petroleum drilling and production operations demand a great quantity of information relating to the parameters and conditions downhole. Such information typically includes the location and orientation of the borehole and drilling assembly, earth formation properties, and drilling environment parameters downhole. The gathering of information relating to formation properties and conditions downhole is commonly referred to as "logging", and can be performed during the drilling process or separately from the drilling process.

Various measurement tools exist for use in logging while drilling (LWD). One such tool is the electromagnetic resistivity tool, which includes one or more antennas for transmitting an electromagnetic signal into the formation and one or more antennas for receiving a formation response. When operated at low frequencies, the electromagnetic resistivity tool (resistivity tool) may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the received signals are compared to the amplitude and/or phase of the transmitted signals to measure the formation resistivity. In other cases, the amplitude and/or phase of the different received signals are compared to each other to measure the formation resistivity.

One or more tilted antennas may be included in the resistivity tool and other various logging tools, and a tilted antenna may by physically tilted at a certain angle relative to the tool axis. However, because of electromagnetic interference, e.g. from the tool, a tilted magnetic dipole of the antenna is not necessarily equal to the physical tilt of the antenna as is desired. This discrepancy decreases the accuracy of the logging tool, which decreases efficiency and reliability of all processes and decisions based on the logging data.

BRIEF DESCRIPTION OF THE DRAWINGS

Accordingly, there are disclosed herein systems and methods that adjust the orientation of magnetic dipole antennas using materials with anisotropic magnetic permeabilities. In the following detailed description of the various disclosed embodiments, reference will be made to the accompanying drawings in which:

FIG. 1 is a contextual view of an illustrative logging while drilling environment;

FIG. 3 is an isometric view of an illustrative resistivity logging tool having tilted coil antennas;

FIG. 5B is perspective and side views of an illustrative placement for the magnetically anisotropic material;

Figure 2:
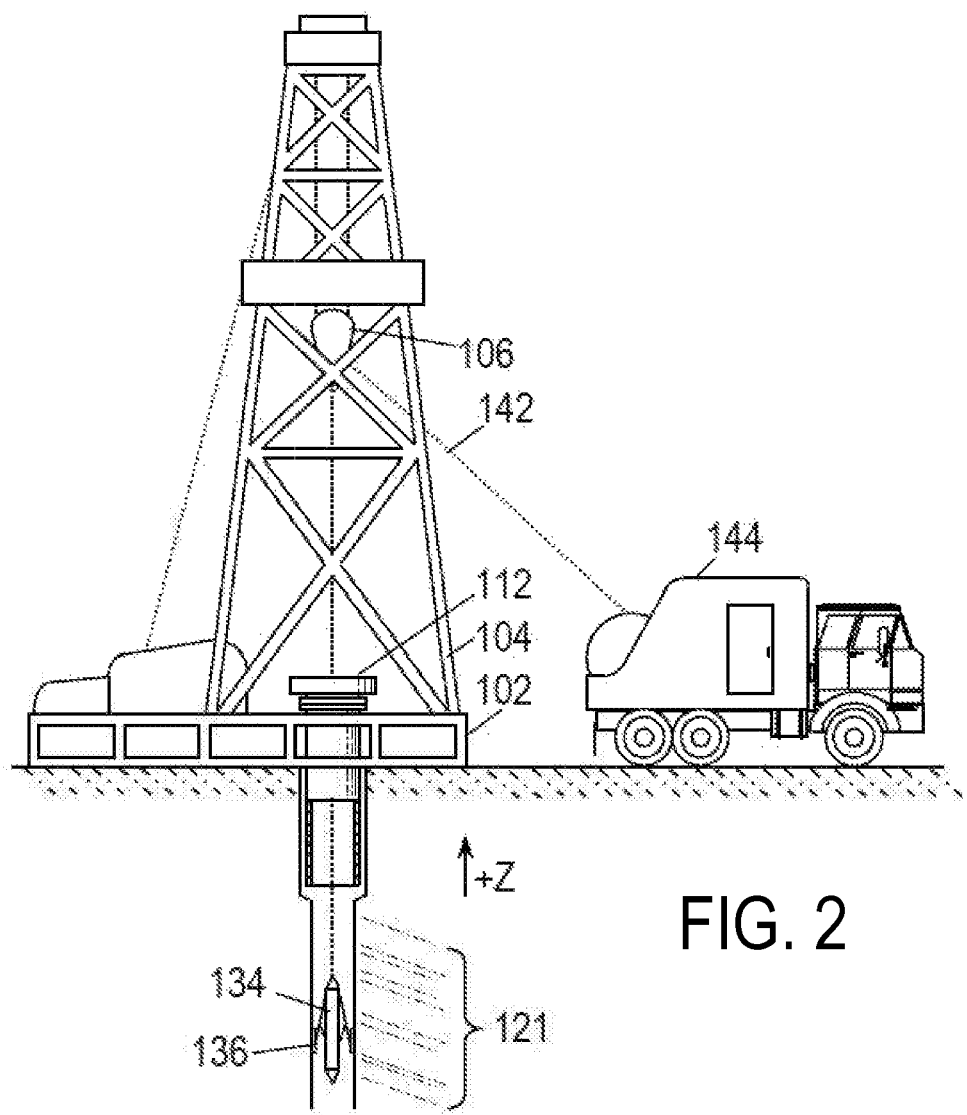
FIG. 2 is a contextual view of an illustrative wireline logging environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

Notation and Nomenclature

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct connection, e.g. mechanical or electrical connections. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

The issues identified in the background are at least partly addressed by systems and methods for modifying a magnetic tilt angle using a magnetically anisotropic material. To illustrate a context for the disclosed systems and methods, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling accomplished by rotating the drill string 8, by use of a downhole motor near the bit 14, or by both methods. The bit 14 is shown penetrating a formation having a series of layered beds 34.

Drilling fluid, termed mud, is pumped by mud recirculation equipment 16 through supply pipe 18, through the kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging while drilling (LWD) environment, downhole sensors 26 are located in the drillstring 8 near the bit 14. The downhole sensors 26 may include directional instrumentation and a resistivity tool with tilted antennas. In some embodiments, directional measurements are made as follows: a three axis accelerometer measures the earth's gravitational field vector relative to the tool axis and a point on the circumference of the tool called the "tool face scribe line". (The tool face scribe line is drawn on the tool surface as a line parallel to the tool axis.) From this measurement, the inclination and tool face angle of the LWD tool can be determined. Additionally, a three axis magnetometer measures the earth's magnetic field vector in a similar manner From the combined magnetometer and accelerometer data, the horizontal angle of the LWD tool can be determined. In addition, a gyroscope or other form of inertial sensor may be incorporated to perform position measurements.

In some embodiments, the downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to a surface installation that processes and stores the measurements. The surface installation typically includes a computer system that may be used to inform the driller of the relative position and distance between the drill bit and nearby bed boundaries.

For a wireline environment, as shown in FIG. 2, a drilling platform 102 is equipped with a derrick 104 that supports a hoist 106. At various times during the drilling process, the drill string is removed from the borehole. Once the drill string has been removed, logging operations can be conducted using a wireline logging tool 134, i.e., a sensing instrument sonde suspended by a cable 142, run through the rotary table 112, having conductors for transporting power to the tool and telemetry from the tool to the surface. A multi-component induction logging portion of the logging tool 134 may have centralizing arms 136 that center the tool within the borehole as the tool is pulled uphole. A logging facility 144 collects measurements from the logging tool 134, and includes a processing system for processing and storing the measurements 121 gathered by the logging tool from the formation.

Referring now to FIG. 3, an illustrative LWD resistivity tool 302 is shown, though the discussion is generally applicable to wireline resistivity tools as well. For clarity, the resistivity tool will be used as an example, however, in various embodiments other downhole tools that include tilted antennas may be used, potentially including: permittivity logging tools, ranging tools, geosteering tools, nuclear magnetic resonance tools, and electromagnetic telemetry tools. The tool 302 is provided with one or more regions of reduced diameter for suspending a wire coil. The wire coil is placed in the region and spaced away from the tool surface by a constant distance. To mechanically support and protect the coil, a non-conductive filler material such as epoxy, rubber, fiberglass, or ceramics may be used to fill in the reduced diameter regions. In at least one embodiment, a magnetically anisotropic material may be used to fill the reduced diameter regions and calibrate the tilted antenna as discussed below. The transmitter and receiver coils may include as little as one loop of wire, although more loops may provide additional signal power. The distance between the coils and the tool surface is preferably in the range from 1/16 inch to 3/4 inch, but may be larger.

The illustrated resistivity tool 302 has six coaxial transmitters 306 (T5), 308 (T3), 310 (T1), 316 (T2), 318 (T4), and 320 (T6), meaning that the axes of these transmitters coincide with the longitudinal axis of the tool. In addition, tool 302 has three tilted receiver antennas 304 (R3), 312 (R1), and 314 (R2). The term "tilted" indicates that the plane of the coil is not perpendicular to the longitudinal tool axis.

The spacing of the antennas may be stated in terms of a length parameter x, which in some embodiments is about 16 inches. Measuring along the longitudinal axis from a midpoint between the centers of receiver antennas 312 and 314, transmitters 310 and 316 are located at ±1x, transmitters 308 and 318 are located at ±2x, and transmitters 306 and 320 are located at ±3x. The receiver antennas 312 and 314 may be located at ±x/4. In addition, a receiver antenna 304 may be located at plus or minus 4x.

The length parameter and spacing coefficients may be varied as desired to provide greater or lesser depth of investigation, higher spatial resolution, or higher signal to noise ratio. However, with the illustrated spacing, symmetric resistivity measurements can be made with 1x, 2x, and 3x spacing between the tilted receiver antenna pair 312, 314, and the respective transmitter pairs 310 (T1), 316 (T2); 308 (T3), 318 (T4); and 306 (T5), 320 (T6). In addition, asymmetric resistivity measurements can be made with 1x, 2x, 3x, 5x, 6x, and 7x spacing between the tilted receiver antenna 304 and the respective transmitter 306, 308, 310, 316, 318, and 320. This spacing configuration provides tool 302 with some versatility, enabling it to perform deep (but asymmetric) measurements for bed boundary detection and symmetric measurements for accurate azimuthal resistivity determination.

In some contemplated embodiments, the transmitters may be tilted and the receivers may be coaxial, while in other embodiments, both the transmitters and receivers are tilted, though preferably the transmitter and receiver tilt angles are different. Moreover, the roles of transmitter and receiver may be interchanged while preserving the usefulness of the measurements made by the tool. In operation, each of the transmitters is energized in turn, and the phase and amplitude of the resulting voltage induced in each of the receiver coils are measured. From these measurements, or a combination of these measurements, the formation resistivity can be determined in three dimensions.

In the illustrated embodiment of FIG. 3, the receiver coils are tilted with a 45 degree angle relative to the tool axis. Angles other than 45 degrees may be employed, and in some contemplated embodiments, the receiver coils are tilted at unequal angles or are tilted in different azimuthal directions. The tool 302 is rotated during the drilling (and logging) process, so that resistivity measurements can be made with the tilted coils oriented in different azimuthal directions. For clarity, calibration of a single exemplary coil will be discussed, however, multiple coils at different tilts may be calibrated using magnetically anisotropic material. In at least one embodiment, the tool 302 includes separate subs or modules. The subs include an attachment mechanism that enables each sub to be coupled to other subs. In some embodiments, the attachment mechanism may be a threaded pin and box mechanism. In other embodiments, the attachment mechanism may be a screw-on mechanism, a press-fit mechanism, a weld, or the like. The subs may be provided with electronics that allow them each to operate an antenna as a transmitter or a receiver. In some embodiments, a one-line power and communications bus (with the tool body acting as the ground) is provided to enable power transfer and digital communications between subs. The subs can be mixed and matched to form a completely customized tool as needed.

Figure 4:
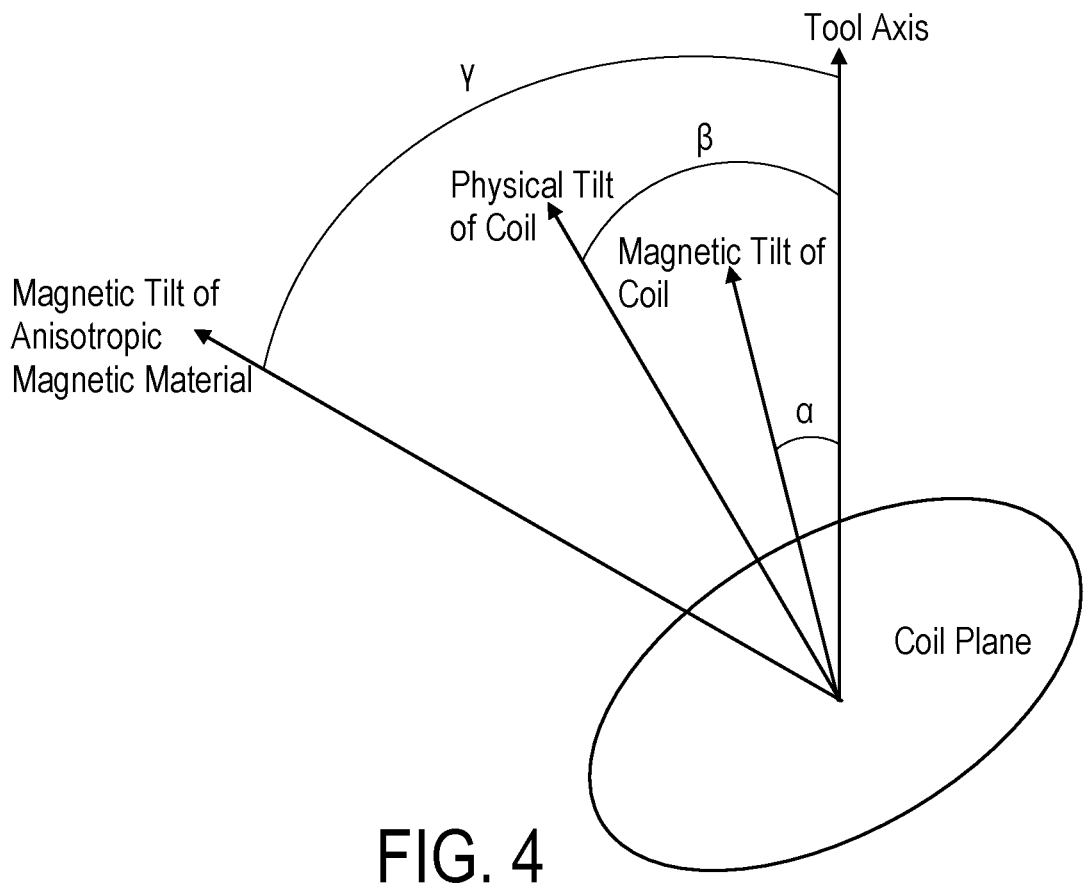
FIG. 4 is a geometrical diagram of illustrative relationships between the tool axis, the coil axis, the anisotropy axis, and the magnetic dipole axis.

FIG. 4 illustrates various angles and the orientation of an exemplary coil relative to the longitudinal tool axis. The antenna coil includes one or more loops that lie in or generally parallel to a "coil plane", the physical orientation of which can be represented by a perpendicular, or normal, vector. In FIG. 4, the normal vector is tilted relative to the tool axis such that the physical tilt of the coil, β, is 45 degrees. In other embodiments, the physical tilt of the coil may be greater or less than 45 degrees relative to the tool axis. Because of the interaction between the electromagnetic field of the coil and other parts of the tool, a coil having a physical tilt of 45 degrees does not necessarily have a magnetic dipole field axis orientation, or "magnetic tilt", of 45 degrees as is desired. As illustrated, the magnetic tilt of the coil, α, is less than 45 degrees. For example, the magnetic tilt of the coil may be 35 degrees. In other embodiments, the magnetic tilt of the coil may be greater than 45 degrees. In either case, the discrepancy between the desired magnetic tilt of the coil and the actual magnetic tilt of the coil decreases the accuracy of the tool 302 (see FIG. 3), which decreases efficiency and reliability of all processes and decisions based on the logging data.

A magnetically anisotropic material may be installed on the tool 302, and the material may have a principle axis of magnetic permeability anisotropy, or "magnetic tilt", at an angle γ relative to the tool axis. For clarity, the physical tilt of the magnetically anisotropic material is not shown. However, in one embodiment, the physical tilt of the magnetically anisotropic material matches the physical tilt of the coil.

Because the material has an anisotropic magnetic permeability, the different magnetic field components are affected differently, enabling the anisotropic element to counter the effects of the tool body. That is, the magnetic tilt of the anisotropic material, γ, modifies the magnetic tilt of the coil, α, such that the modified, or calibrated, magnetic tilt of the coil is approximately equal to the physical tilt of the coil. For example, α is 35 degrees when unmodified, and for a suitably dimensioned magnetically anisotropic material a γ of 53.1 degrees modifies α to be approximately β, or 45 degrees relative to the tool axis. The modification increases the accuracy of the tool 302 and the logging data, which increases efficiency and reliability of all processes and decisions based on the logging data.

A discussion of magnetically anisotropic materials will be helpful. Magnetically anisotropic materials are described by the relationship, $\overline{B} = \overline{\overline{\mu}} \cdot \overline{H}$, between the magnetic field strength $\overline{H}$, the magnetic flux density $\overline{B}$, and the permeability tensor, $\overline{\overline{\mu}}$. The relationship can be written in matrix form as $$\overline{B} = \begin{bmatrix} B_x \\ B_y \\ B_z \end{bmatrix} = \overline{\overline{\mu}} \cdot \overline{H} = \begin{bmatrix} \mu_{xx} & \mu_{xy} & \mu_{xz} \\ \mu_{yx} & \mu_{yy} & \mu_{yz} \\ \mu_{zx} & \mu_{zy} & \mu_{zz} \end{bmatrix} \cdot \begin{bmatrix} H_x \\ H_y \\ H_z \end{bmatrix}$$

Each element $\mu_{mn}$ of the permeability tensor, $\overline{\overline{\mu}}$, is a coefficient connecting the $\hat{n}$ direction component of $\overline{H}$ and the $\hat{m}$ direction component of $\overline{B}$. Generally, a magnetically anisotropic material is characterized by its diagonalized relative permeability tensor:

$$\overline{\overline{\mu}}_r = \begin{bmatrix} \mu_{uu} & 0 & 0 \\ 0 & \mu_{vv} & 0 \\ 0 & 0 & \mu_{ww} \end{bmatrix}$$

with principle coordinates u, v, and w representing the strength of the magnetic field on three principle axes respectively. For modification purposes, one of the diagonalized elements may dominate the others in at least one embodiment. For example, $\mu_{uu} \gg \mu_{vv}$, and $\mu_{uu} \gg \mu_{ww}$. The ratio between the magnitude of the vector in the principle, or dominant, direction (e.g. u) versus the magnitude of the vectors in the non-principle, or non-dominant, directions (e.g. v and/or w) may be 100 to 1 or greater in at least one embodiment. The magnetically anisotropic material may be formed from a plurality of laminae of grain material having a particular orientation in at least one embodiment. The magnetically anisotropic material may also be formed by crushing and pulverizing ingots obtained by melting a suitable material, molding the resulting fine particles in a magnetic field, and then sintering in at least one embodiment. The magnetically anisotropic material may also be formed by using a topotactic reaction to transform an oriented but feeble magnetic material into a ferromagnetic material.

Figure 5A:
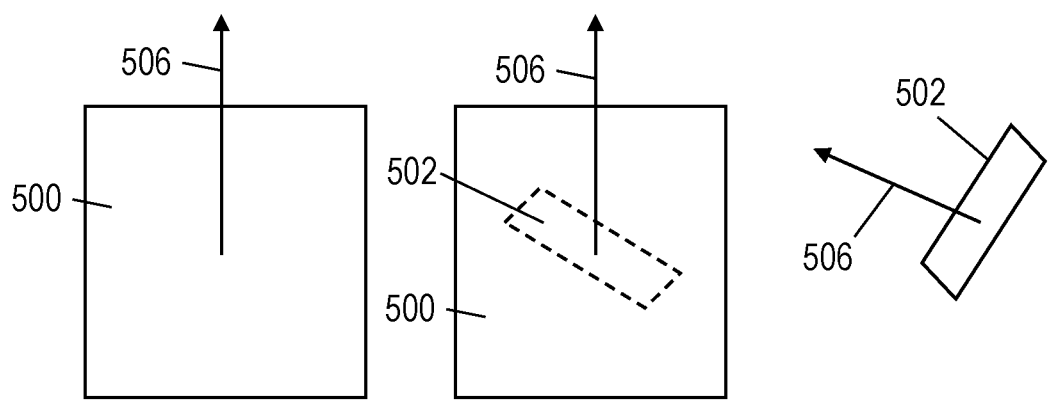
FIG. 5A is a sequence view of an illustrative magnetically anisotropic manufacture.

FIG. 5A illustrates machining a magnetically anisotropic material having a desired principle direction. First, a larger portion of anisotropic material 500 is determined to have a principle direction 506. Next, a smaller portion of magnetically anisotropic material 502 is machined from the larger portion 500 such that the angle of the principle direction 506 relative to the tool axis, when installed on the tool 302 is equal to the magnetic tilt, γ, desired to modify the magnetic tilt of the coil, α. Multiple smaller portions 502 having different principle directions may be machined from the larger portion 500 in order to determine a relationship between γ and α as explained below.

FIG. 5B illustrates two views of the magnetically anisotropic material 502 installed on the tool 302. As illustrated, in at least one embodiment, the magnetically anisotropic material 502 is radially closer to the tool axis than the coil. Although only one turn of the coil is illustrated, in other embodiments, the coil includes multiple turns. The antenna coil may enclose or encircle the tool body, and the magnetically anisotropic material 502 may form a layer between the tool body and the antenna coil. In at least one embodiment, the magnetically anisotropic material 502 has the shape of a tilted collar, and is split into pieces for assembly on the tool body. For example, the magnetically anisotropic material 502 may be split into two pieces, and those two pieces may be coupled together around the tool body during installation.

Figure 6:
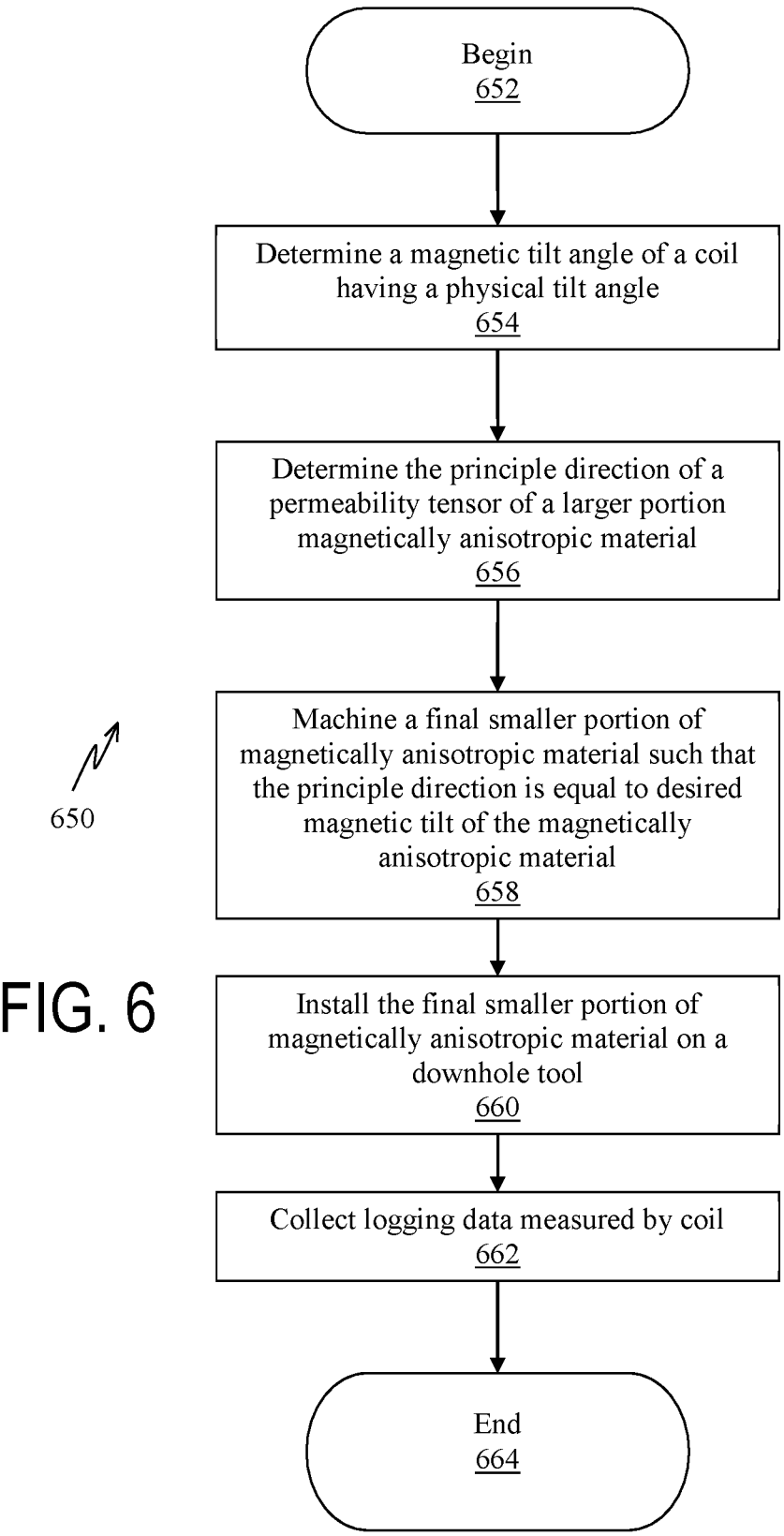
FIG. 6 is a flow chart illustrating a method of modifying a magnetic tilt angle using a magnetically anisotropic material.

FIG. 6 illustrates a method 650 of modifying a magnetic tilt angle using a magnetically anisotropic material beginning at 652 and ending at 664. At 654, an unmodified magnetic tilt angle of a coil having a physical tilt angle relative to the tool axis is determined. For example, the coil may have an unmodified magnetic tilt angle of 35 degrees and a physical tilt angle of 45 degrees. In at least one embodiment, the unmodified magnetic tilt angle is measured empirically using electromagnetic sensing equipment and the like. In an alternative embodiment, enough electromagnetic parameters of coil and tool 302 (see FIG. 3) are known such that the unmodified magnetic tilt angle of the coil may be calculated or simulated.

At 656, a principle direction of a larger portion of magnetically anisotropic material is determined. The principle direction may be determined empirically by measurement of the magnetic characteristics of the magnetically anisotropic material. If the diagonalized permeability tensor has a dominant direction above a threshold (e.g. above a ratio of 100 to 1 as explained above), the anisotropic material may be selected for use. Next, multiple smaller portions of the magnetically anisotropic material may be machined from the larger portion, each having a different angle of principle direction relative to the tool axis when installed on the tool 301. These different angles of principle direction are potential magnetic tilt angles of the final smaller portion of magnetically anisotropic material. For example, thirteen smaller portions may be machined from the larger portion and the range of angles of their principle directions when installed on the tool may be from 49 degrees to 56 degrees.

Figure 7:
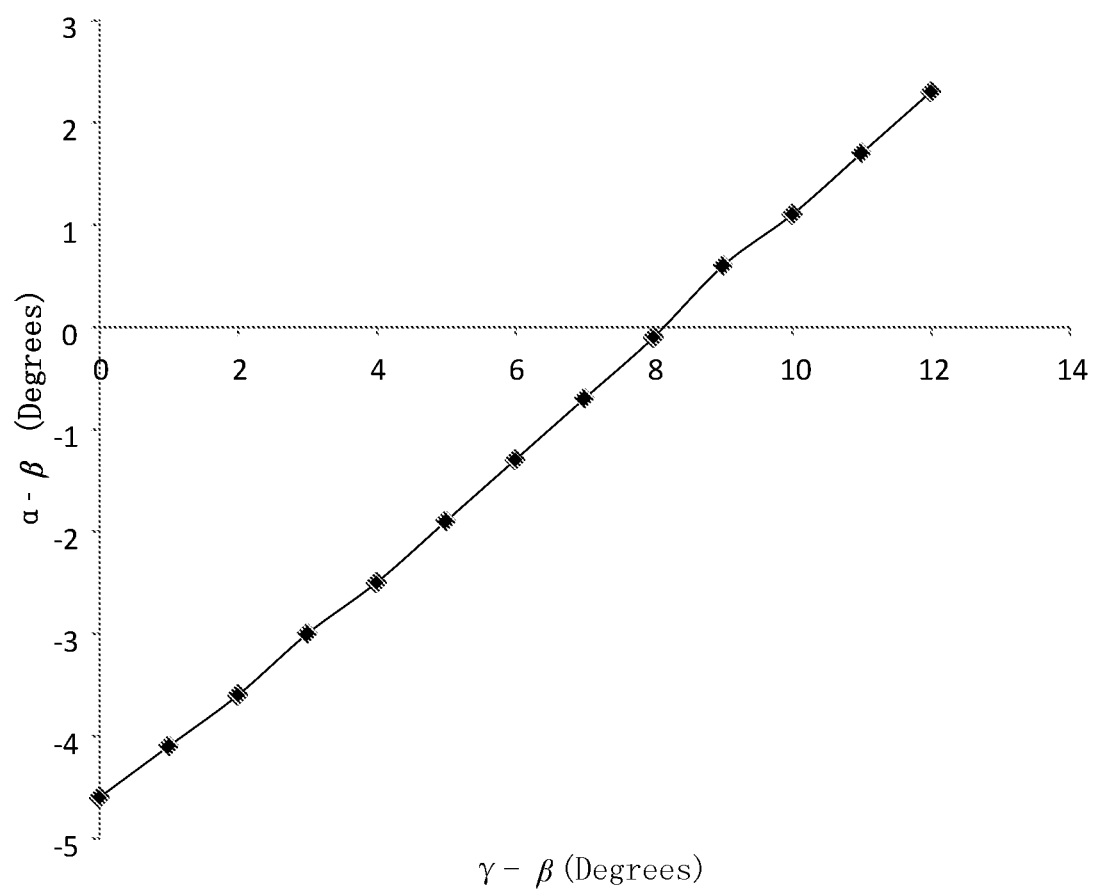
FIG. 7 is a graph of an illustrative orientation discrepancy as a function of an anisotropic material deviation.

In at least one embodiment, a relationship between the magnetic tilt angle of the coil and the magnetic tilt angle of the magnetically anisotropic material may be determined. In at least one embodiment, a number of potential modified magnetic tilt angles of the coil may be determined in response to the potential magnetic tilt angles of the final smaller portions. For example, the thirteen smaller portions may be installed on the tool 302 so that thirteen responses may be measured. Using these inputs and responses as data points, the points may be plotted as shown in FIG. 7 in terms of degrees relative to the tool axis as shown in FIG. 4.

Next, a curve of best fit or regression analysis may be performed on these data points. For example, a mostly linear curve connecting the thirteen data points in FIG. 7 may be determined. In other embodiments, the curve is not mostly linear depending upon the location of the data points. Next, where the curve or model indicates that the modified magnetic tilt angle is equal to the physical tilt angle (which is a known parameter), the magnetic tilt angle of the final smaller portion of magnetically anisotropic material may be interpolated. For example, FIG. 7 illustrates that in order for the magnetic tilt angle of the coil to equal the physical tilt angle ($\alpha-\beta=0$), the difference between the magnetic tilt angle of the final smaller portion of magnetically anisotropic material and the physical tilt angle of the coil should be about 8.1 degrees ($\gamma-\beta=8.1$). Because the physical tilt angle of the coil, $\beta$, is known to be 45 degrees in this example, the magnetic tilt angle of final smaller portion of magnetically anisotropic material, $\gamma$, may be determined to be 53.1 degrees (45+8.1=53.1).

Returning to FIG. 6, at 658, the final smaller portion of the magnetically anisotropic material may be machined from the larger portion such that the angle of principle direction when installed on the tool is the desired magnetic tilt angle, e.g. 53.1 degrees. At 660, the final smaller portion may be installed on the tool 302. The magnetic tilt angle of the magnetically anisotropic material (53.1 degrees), when installed, modifies the magnetic tile angle of the coil (35 degrees) to be approximately equal to the physical tilt angle of the coil (45 degrees). At 662, logging data measured by the coil, now having a magnetic tilt angle approximately equal to the coil's physical tilt angle, is collected. The modification increases the accuracy of the logging data and the tool 302, which increases the efficiency and reliability of all processes and decisions based on the logging data. Next, in at least some embodiments one or more electrical properties of the formation may be derived based on the logging data. For example, various resistivities of the formation may be derived by processors located on the tool 302 or at the surface based on the logging data. Also, the method 650 may include displaying a log created with the logging data. Such a log may be printed on paper, displayed on a computer screen or other monitor, incorporated into in an earth model that is displayed during a visualization process, and the like. In at least one embodiment, displaying the log includes outputting the logging data for view.

An electromagnetic logging tool for acquiring electrical property measurements of a formation penetrated by a borehole includes an antenna coil oriented at a physical tilt angle relative to a longitudinal axis of the tool; and a magnetically anisotropic material that modifies a magnetic tilt angle of the coil relative to the physical tilt angle.

The magnetically anisotropic material may modify the magnetic tilt angle to be approximately equal to the physical tilt angle. The physical tilt angle may be 45 degrees. The tool may include a tool body that is enclosed by the antenna coil. The magnetically anisotropic material may form a layer between the tool body and the antenna coil. The magnetically anisotropic material may have the shape of a tilted collar. The magnetically anisotropic material may be machined from a bulk of magnetically anisotropic material. The magnetically anisotropic material may be split into pieces for assembly on the tool body. The magnetically anisotropic material may have a characteristic diagonalized permeability tensor having a ratio between a dominant component and each non-dominant component of at least 100 to 1. The tool may be a logging-while-drilling tool.

An apparatus includes a magnetically anisotropic material having the shape of a tilted collar to modify a magnetic tilt angle of a coil, tilted at a physical tilt angle, to be approximately equal to the physical tilt angle.

The magnetically anisotropic material may have a characteristic diagonalized permeability tensor having a ratio between a dominant component and each non-dominant component of at least 100 to 1. The magnetically anisotropic material may be machined from a bulk of magnetically anisotropic material. The magnetically anisotropic material may be split into pieces for assembly on the tool body. The magnetically anisotropic material may be machined from a larger portion of magnetically anisotropic material such that a principle direction of the larger portion becomes a magnetic tilt angle of the magnetically anisotropic material relative to the tool axis.

An electromagnetic logging method includes: conveying an electromagnetic logging tool along a borehole that penetrates a formation, the tool having: at least one transmit antenna and at least one receive antenna with at least one of said antennas being a tilted antenna oriented at a physical tilt angle relative to a longitudinal axis of the tool; and a magnetically anisotropic material that modifies a magnetic tilt of the tilted antenna relative to the physical tilt angle; driving the at least one transmit antenna to create an electromagnetic field that is affected by the formation; obtaining a measurement of the electromagnetic field with the at least one receive antenna; and deriving an electrical property of the formation based at least in part on said measurement.

The method may include repeating said driving, obtaining, and deriving to determine a log of the electrical property as a function of position along the borehole. The method may include displaying the log. The magnetically anisotropic material may modify the magnetic tilt angle to be approximately equal to the physical tilt angle. The physical tilt angle may be 45 degrees.

While the present disclosure has been described with respect to a limited number of embodiments, those skilled in the art will appreciate numerous modifications and variations therefrom. It is intended that the appended claims cover all such modifications and variations.

What is claimed is:
1. An electromagnetic logging tool for acquiring electric property measurements of a formation penetrated by a borehole, the tool comprising:
 a region with a reduced diameter;
 an antenna coil oriented at a physical tilt angle relative to a longitudinal axis of the tool, the antenna coil disposed within the region with the reduced diameter; and a magnetically anisotropic material that modifies a magnetic tilt angle of the antenna coil relative to the physical tilt angle.

2. The tool of claim 1, wherein the magnetically anisotropic material modifies the magnetic tilt angle to be approximately equal to the physical tilt angle.

3. The tool of claim 2, wherein the physical tilt angle is 45 degrees.

4. The tool of claim 1, further comprising a tool body that is enclosed by the antenna coil.

5. The tool of claim 4, wherein the magnetically anisotropic material forms a layer between the tool body and the antenna coil.

6. The tool of claim 1, wherein an angle of the magnetic tilt of the magnetically anisotropic material is greater than the physical tilt angle of the antenna coil, wherein the physical tilt angle of the antenna coil is greater than a magnetic tilt of the antenna coil.

7. The tool of claim 6, wherein the magnetically anisotropic material is machined from a bulk of magnetically anisotropic material.

8. The tool of claim 5, wherein the magnetically anisotropic material is split into pieces for assembly on the tool body.

9. The tool of claim 1, wherein the magnetically anisotropic material has a characteristic diagonalized permeability tensor having a ratio between a dominant component and each non-dominant component of at least 100 to 1.

10. The tool of claim 1, wherein the tool is a logging-while-drilling tool.

11. An apparatus for acquiring electrical property measurements of a formation penetrated by a borehole, the apparatus comprising:
a region with a reduced diameter; and
a magnetically anisotropic material having a shape of a tilted collar to modify a magnetic tilt angle of a coil that is tilted at a physical tilt angle, the coil disposed within the region with the reduced diameter.

12. The apparatus of claim 11, wherein the magnetically anisotropic material has a characteristic diagonalized permeability tensor having a ratio between a dominant component and each non-dominant component of at least 100 to 1.

13. The apparatus of claim 11, wherein the magnetically anisotropic material is machined from a bulk of magnetically anisotropic material.

14. The apparatus of claim 11, wherein an angle of a magnetic tilt of the magnetically anisotropic material is greater than the physical tilt angle of the coil, wherein the physical tilt angle of the coil is greater than the magnetic tilt of the coil.

15. The apparatus of claim 11, wherein the magnetically anisotropic material is machined from a larger portion of magnetically anisotropic material such that a principle direction of the larger portion becomes a magnetic tilt angle of the magnetically anisotropic material relative to the tool axis.

16. An electromagnetic logging method, comprising:
conveying an electromagnetic logging tool along a borehole that penetrates a formation, the tool comprising:
a region with a reduced diameter; and
at least one transmit antenna and at least one receive antenna with at least one of said antennas being a tilted antenna oriented at a physical tilt angle relative to a longitudinal axis of the tool, the tilted antenna disposed within the region with the reduced diameter; and
a magnetically anisotropic material that modifies a magnetic tilt of the tilted antenna relative to the physical tilt angle;
driving the at least one transmit antenna to create an electromagnetic field that is affected by the formation;
obtaining a measurement of the electromagnetic field with the at least one receive antenna; and
deriving an electrical property of the formation based at least in part on said measurement.

17. The method of claim 16, further comprising repeating said driving, obtaining, and deriving to determine a log of the electrical property as a function of position along the borehole.

18. The method of claim 17, further comprising displaying the log.

19. The method of claim 16, wherein an angle of a magnetic tilt of the magnetically anisotropic material is greater than the physical tilt angle of the tilted antenna, wherein the physical tilt angle of the tilted antenna is greater than the magnetic tilt of the tilted antenna.

20. The method of claim 19, wherein the physical tilt angle is 45 degrees.

* * * * *